(12) United States Patent
Scheibner et al.

(10) Patent No.: US 6,658,750 B2
(45) Date of Patent: Dec. 9, 2003

(54) METHOD AND MEASUREMENT DEVICE FOR MEASUREMENT OF A TWO-WHEELED VEHICLE FRAME

(76) Inventors: Bernd Scheibner, Veltheimer Strasse 24, D-38162 Schulenrode (DE); Rainer Schaefer, Breite Strasse 11, D-38212 Cramme (DE)

( * ) Notice: Subject to any disclaimer, the term of this patent is extended or adjusted under 35 U.S.C. 154(b) by 0 days.

(21) Appl. No.: 10/190,794

(22) Filed: Jul. 9, 2002

(65) Prior Publication Data

US 2003/0009892 A1 Jan. 16, 2003

(30) Foreign Application Priority Data

Jul. 10, 2001 (DE) .......................................... 101 32 769

(51) Int. Cl.$^7$ ................................................. G01B 5/24
(52) U.S. Cl. ........................................... 33/288; 33/645
(58) Field of Search ........................... 33/286, 288, 292, 33/533, 613, 645

(56) References Cited

U.S. PATENT DOCUMENTS

| | | | | |
|---|---|---|---|---|
| 4,015,339 A | * | 4/1977 | Hörvallius | 33/288 |
| 4,630,379 A | * | 12/1986 | Wickmann et al. | 33/288 |
| 5,694,699 A | * | 12/1997 | Folson | 33/645 |
| 5,737,073 A | * | 4/1998 | Wente et al. | 33/288 |

FOREIGN PATENT DOCUMENTS

| | | |
|---|---|---|
| DE | 198 12 911 | 10/1999 |
| EP | 0 491 369 | 9/1995 |
| EP | 0 704 671 | 4/1996 |

* cited by examiner

*Primary Examiner*—G. Bradley Bennett
(74) *Attorney, Agent, or Firm*—Whitham, Curtis & Christofferson, PC (57) ABSTRACT

In order to measure a two-wheeled vehicle frame, in which an essentially U-shaped measurement bracket (12) with two limbs (13) and an upper crossbar (14) is inserted, centered, into a retaining hole (5) which is at right angles to the longitudinal axis, and is moved to a fixed angular position, an optically acting component (9) is mounted in a defined position relative to the steering axis (2) of the two-wheeled vehicle frame, and a relative position between the measurement bracket (12) and the optical component (9) is fixed by means of a beam path between the measurement bracket (12) and the optically acting component (9), the invention provides that the optically acting component (9) is mounted in the headstock (1) without any play but such that it can rotate, using an adjustable-height insert (7) which in provided with a first scale, the crossbar (14) is provided with a horizontal marking (18) and with a central horizontal second scale (17), the crossbar is provided with an optically acting surface (16), whose distance from a plane (20), which runs parallel to this surface through the center of the retaining hole (5), is defined, the optical component (9) is provided with a marking which allows a mechanical distance measurement to a marking (18) on the measurement bracket (12) and whose distance from the optical axis (10) of the beam path is defined, the distance between the horizontal marking (18) on the crossbar (14) of the measurement bracket (12) and the center axis of the retaining hole (5) is defined, and that the parameters which are required for the measurement are determined using the defined constant dimensions, by means of mechanical measurements and optical determinations.

19 Claims, 5 Drawing Sheets

Fig. 2

METHOD AND MEASUREMENT DEVICE FOR MEASUREMENT OF A TWO-WHEELED VEHICLE FRAME

BACKGROUND OF THE INVENTION

Field of the Invention

The invention relates to a method for measurement of a two-wheeled vehicle frame, in which an essentially U-shaped measurement bracket with two limbs and an upper crossbar is inserted, centered, into a retaining hole which is at right angles to the longitudinal axis, and is moved to a fixed angular position, an optically acting component is inserted into a headstock of the two-wheeled vehicle frame, and a relative position between the measurement bracket and the optical component is fixed by means of a beam path between the measurement bracket and the optically acting component.

The invention also relates to a measurement device for measurement of a two-wheeled vehicle frame having an essentially U-shaped measurement bracket, which can be centered, can be fixed in a fixed angular position, and has two limbs and an upper crossbar, and having an optically acting component, which can be inserted into a headstock of the two-wheeled vehicle frame, in order to form a beam path between the measurement bracket and the optically acting component.

Numerous methods and measurement devices of this type are known.

EP 0 491 369 B1 discloses a rail which is inserted in a headstock and whose longitudinal axis extends at right angles to the direction of the longitudinal axis. A laser which interacts with reflectors fitted to the bracket can be moved on the rail.

According to EP 0 704 671 A2, image recorders, which are aimed at an arrangement, which is inserted into the headstock and has two balls arranged axially one above the other, are inserted into the crossbar of the measurement bracket, in the region of the limbs. The connection vector between the two balls can be determined uniquely by means of photogrammetric evaluation methods, so that it is possible to define the relative position of the headstock axis with respect to the mounting axis of the bracket.

The known methods and apparatuses have the common feature that the data relating to the two-wheeled vehicle frame is determined exclusively on the basis of the optical measurements. The known arrangements are relatively complex, so that it is financially impossible to purchase them for relatively small workshops. Any measurement which is required per se on a two-wheeled vehicle frame which might have been damaged in an accident is thus frequently not carried out, for financial reasons, and leads to danger to the user of the two-wheeled vehicle, in particular of a motor cycle.

The invention is based on the problem of allowing a two-wheeled vehicle frame to be measured using a simpler and lower-cost apparatus, as well.

Against the background of this problem, the method mentioned initially according to the invention for measurement of a two-wheeled vehicle frame is characterized in that the optically acting component is mounted in the headstock without any play but such that it can rotate, using an adjustable-height insert which is provided with a first scale, the crossbar is provided with a horizontal marking and with a central horizontal second scale, the crossbar is provided with an optically acting surface, whose distance from a plane, which runs parallel to this surface through the center of the retaining hole is defined, the optical component is provided with a marking which allows a mechanical distance measurement to a marking on the measurement bracket and whose distance from the optical axis of the beam path is defined, the distance between the horizontal marking on the crossbar of the measurement bracket and the center axis of the retaining hole is defined, and in that the parameters which are required for the measurement are determined using the defined constant dimensions, by means of mechanical measurements and optical determinations.

The method according to the invention thus provides for evaluation of the necessary optical measurements using data which is obtained from defined constant dimensions of the apparatus and from mechanical measurements, in particular length measurements. Using the constant dimensions and the measurements which can be obtained mechanically with sufficient accuracy, it is thus possible to keep the complexity for the optical measurements low, so that a simple and low-cost apparatus for measurement of the two-wheeled vehicle frame is made possible.

According to the invention, and in particular to carry out the method according to the invention, the measurement device of the type mentioned initially is characterized in that the optically acting component is mounted in the headstock without any play but such that it can rotate, using an adjustable-height insert which is provided with a first scale, the crossbar is provided with a horizontal marking and with a central horizontal second scale, the crossbar is provided with an optically acting surface, whose distance from a plane, which runs parallel to this surface through the center of the retaining hold is defined, the optical component is provided with a marking which allows a mechanical distance measurement to a marking on the measurement bracket and whose distance from the optical axis of the beam path is defined, and the distance between the horizontal marking on the crossbar of the measurement bracket and the center axis of the retaining hole is defined.

Furthermore, a further marking is preferably provided on the optical component, which is located at a defined distance from the zero point of the first scale and whose distance from the optical axis in the direction of the scale is defined.

In one preferred embodiment, the beam path is defined by a telescope, which is used as an optical component and can be focused at different distances, and which preferably has a reticle in order to determine the center.

As an alternative to this, the beam path may also originate from a laser source, which may be in the form of a bar laser or cruciform laser.

Especially for a laser light source, it may be advantageous for the second scale to be in the form of a movable vernier, and for the movable vernier to have a cruciform marking.

The method according to the invention and the measurement devices according to the invention are suitable for determining the conventional parameters of a two-wheeled vehicle frame, namely for determining the frame length, the frame angle, the camber error and the steering head offset. Furthermore, it is also possible to measure the rear twist and the rear offset.

In one preferred embodiment, in order to determine the frame length and the frame angle, the beam path which originates from the optical component is aimed at the optically acting surface at the height of the horizontal marking of the measurement bracket, and the point at which the beam which is reflected from the optically acting surface strikes the first scale is read, and is evaluated in conjunction with the mechanical length measurement between the marking on the optical component and the horizontal marking of the measurement bracket.

In order to determine the camber error, the optical component is aimed at the horizontal marking on both sides of the measurement bracket by adjusting the height of the optical component, and the respective height setting is read on the first scale, and the difference is related to the distance between the measurement points on the two sides.

In order to determine the steering head offset, a mean error in the zero point of the second scale is determined by aiming the optical component at the center of the first scale after which the height of the optical component is moved to the second scale, and the point at which it strikes the second scale is read, the value that is read being corrected by a measurement of the eccentric mounting of the measurement bracket and taking account of any camber error that is found.

The invention and the determination of the measurement parameters will be explained in more detail in the following text with reference to an exemplary embodiment, which is illustrated in the drawing, and examples of evaluations. In the drawing.

The frame, which is illustrated only schematically in the drawing, comprises a tubular headstock 1, whose longitudinal axis defines a steering axis 2. The headstock 1 is connected to a main tube 3 of the frame, which, in the illustrated exemplary embodiment, is curved downward and ends in a swing-arm bearing 4 with a retaining hole 5.

An insert 7 with centering cones 6 is inserted in the direction of the steering axis 2 into the headstock 1, and a rod 8 is mounted in the insert 7 such that it can be moved, that is to say its height is adjustable. A telescope 9 in mounted at the upper and of the rod 8, and its optical axis 10 is fixed at right angles to the steering axis 2. The telescope 9 is thus mounted in the headstock 1 without any play, but can rotate and its height is adjustable. An upper edge 11 of the housing of the telescope 9 is planar and is at a defined distance from the optical axis 10, so that it can be used as a marking for carrying out a length measurement. A marking (which is not shown) is also arranged at right angles to the optical axis 10 and at right angles to the steering axis 2 on the planar edge 11 of the housing, and its distance from a reticle of the telescope 9 is likewise defined and known. This marking preferably intersects the steering axis 2 (which is equivalent to the longitudinal axis of the rod 8).

Figure 2:
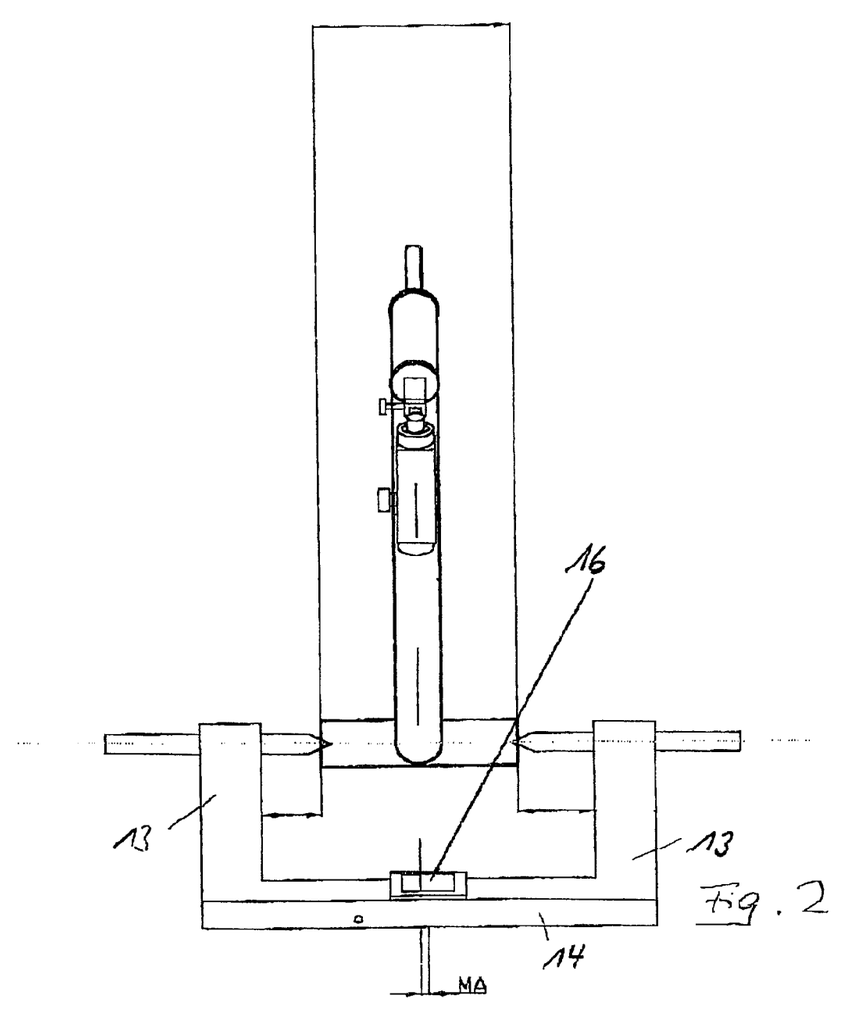
Figure 3:
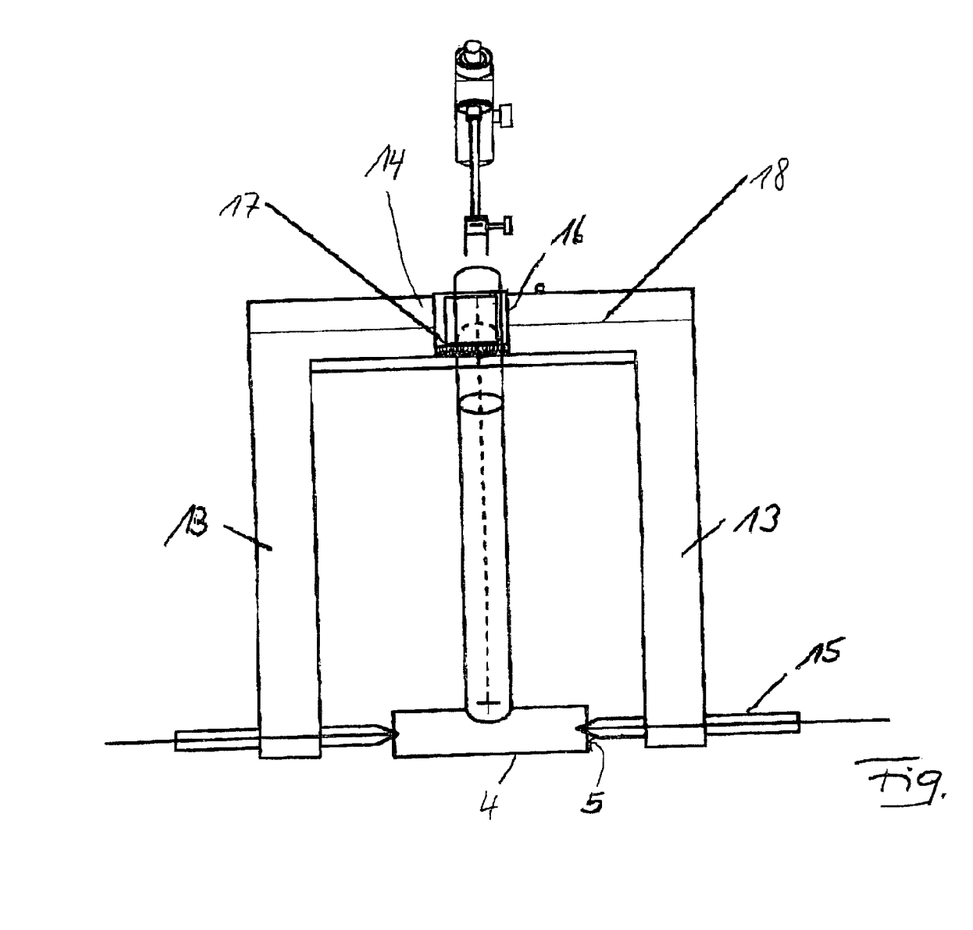

An essentially U-shaped measurement bracket 12 is inserted into the retaining hole 5 of the swing-arm bearing 4 and is composed of two side limbs 13 and an upper crossbar 14 (FIGS. 2, 3). The measurement bracket 12 is inserted from both sides into the retaining hole in the swing-arm bearing 4 using centering mandrels 15, and in aligned approximately centrally by eye. A rectangular mirror 16 is mounted in the center of the crossbar 14 and has a second scale 17 on its lower edge. The crossbar 14 is also provided with a continuous surface scratch 18 as a horizontal marking.

Figure 1:
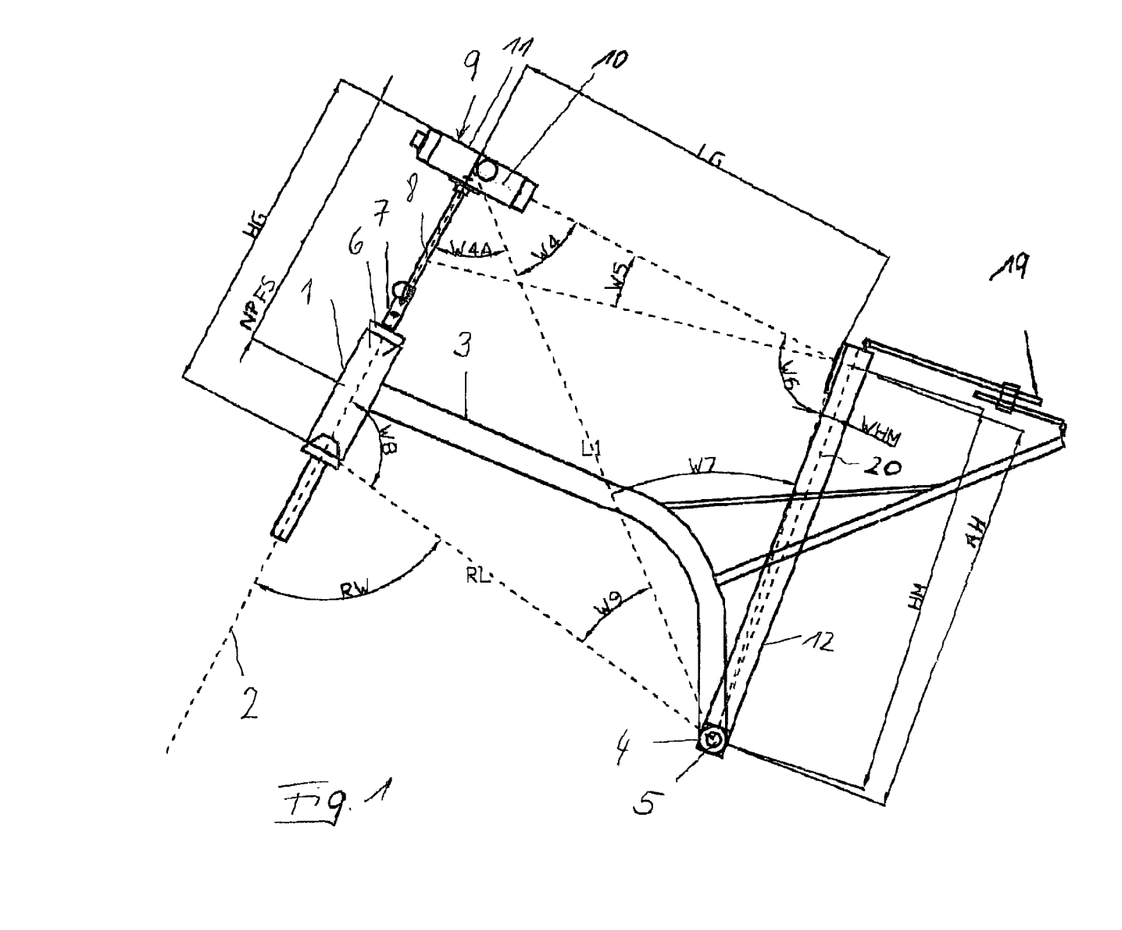
FIG. 1—shows a side view of an apparatus according to the invention, in the mounted position, showing the dimensions and measurement values which are used for determining the parameters, FIG. 2—shows a plan view of the arrangement as shown in FIG. 1, FIG. 3—shows a front view of the arrangement as shown in FIG. 1, FIG. 4—shows a side view, analogous to FIG. 1, for an embodiment with a laser head, FIG. 5—shows a view of a measurement bracket in a corner region, with a target reticle arranged on a vernier scale.

As can be seen from FIG. 1, the bracket 12 is fixed in a predetermined angular position by means of an adjustable bracket support 19. The bracket support 19 is itself supported on the frame tube 3. The measurement bracket 12 is fixed such that it is inclined somewhat with respect to the steering axis 2.

FIG. 1 shows auxiliary lines and length details which are important for determining the necessary measurement parameters. Constant values which are governed by the arrangement and are determined in a defined manner are:

Surface Scratch Height (AH)

The surface scratch height AH is obtained from the distance of the surface scratch 18 an the surface of the crossbar 14 of the measurement bracket 12, projected onto the center plane 20 of the measurement bracket 12, from the center of the retaining hole 5.

Bracket Thickness (BS)

The important factor is half the bracket thickness, that is to say the distance of the surface on which the surface scratch 18 is located from the center plane 20 of the bracket. One precondition in this case is that the centering mandrels 15 are arranged centrally, that is to say with their axes lying on the center plane 20.

Distance between the upper edge 11 and the optical axis 10.

Telescope Scale Zero (NPFS)

The telescope scale zero (NPFS) may lie on the upper edge 11 of the telescope 9, or may be at a defined distance from the upper edge 11. The defined distance between the upper edge 11 and the optical axis 10 means that the first scale on the rod 8 of the telescope 9 is located in a defined position with respect to the optical axis 10.

Mirror Thickness (TS)

The mirror thickness TS indicates the distance between the surface of the mirror 16 and the surface of the crossbar 14 of the measurement bracket 12.

The distance between the surface scratch 18 and the second scale 17 under the mirror is also defined and known.

The following measurement values are determined for the evaluation:

a) Height of the First Scale (Scale 1)

The telescope is swiveled with respect to the center of the measurement bracket 12, that is to say with respect to the center of the mirror 16, and the focusing is adjusted such that the first scale, that is to say the height adjustment scale for the telescope 9, is visible. The value which is located on the horizontal main wire of the reticle is read and noted ("height scale 1"). This can be read with a reading accuracy of 0.5 mm.

b) Distance Between the Telescope and the Mirror (LG)

In the position in which the height of the scale 1 has been determined, a length measurement is carried out from the marking (surface scratch) on the upper edge 11 of the marking (surface scratch) there to the height of the surface scratch 18 on the mirror 16.

c) Body Height (HG)

Without changing the position of the telescope 9, the body height is determined as the length from the lower edge of the steering head 1 to the upper edge 11 of the telescope 9. In this case as well, the reading accuracy is 0.5 mm.

d) Height, Left (HFLI)

The telescope is swiveled to the left-hand side of the bracket in the direction of travel and the optics are focused such that the surface scratch 18 can be seen. The height of the reticle is then set by adjusting the height of the telescope 9 until the main wire lies on the surface scratch 18. The value is read from the vernier (reading accuracy 0.05 mm), and is noted.

e) Height, Right (HFRE)

The height from the right-hand side is measured in the same way, after swiveling the telescope 9 to the right-hand side of the bracket in the direction of travel, with a reading accuracy of 0.05 mm, and is noted.

f) Distance, Left (AbstLi)

Since the bracket is fitted centrally only by eye, the distance between the centering shaft holder and the side frame surfaces at the level of the retaining hole 5 is determined on the left-hand side of the bracket in the direction of travel. This may be done using a steel rule or a measurement gage. The reading accuracy is 0.5 mm and the value is noted.

g) Distance, Right (AbstRe)

The distance between the bracket side and the centering shaft holder in the region of the retaining hole 5 to the right in the direction of travel is determined in the same way, and the value is noted.

h) Center Error (MA)

The telescope is swiveled to the bracket center, that is to say to the center of the mirror 16, and the focusing is adjusted such that the first scale for the height adjustment is visible. The vertical wire is set to the center of the first scale by rotating the telescope. The second scale 17 on the center of the crossbar 14 of the measurement bracket 2 can be seen by varying the depth of focus and by lowering the telescope. The height of the telescope 9 is adjusted such that the upper edge of the scale 2 comes to rest on the horizontal main wire. The center error of the second scale 17 can now be read, with the mathematical sign (reading accuracy 0.5 mm) on the vertical main wire of the reticle, and should be noted.

Determination of the Frame Length (RL)

The frame length RL is defined by the distance between the lower face of the headstock 1 where it intersects the steering axis 2 and the axis of the retaining hole 5 of the swing-arm holder 4. The frame length RL forms a triangle with the angles W4A, W8 and W9 with the diagonal length L1 and the steering axis Z up to the height of the optical axis 10.

In accordance with the sine rule, RL behaves with respect to L1 in the same way that SINW4A behaves with respect to SINW8.

Thus: $RL=L1 *SIN(W4A)/SIN(W8)$ (1)

On the other hand, L1 forms a triangle with the angles W4, W6 and W7 with the connecting line AM between the center point of the retaining hole 5 with the surface of the mirror 16 at the level of the surface scratch 18 and the measured distance LG, provided that the surface or the reflective surface of the mirror 16 is parallel to the center plane 20 of the bracket. However, it is also possible to align the reflective surface of the mirror 16 with the center axis of the retaining hole 5, so that the reflective surface corresponds directly to the angle W6.

Since LG is measured, then, in accordance with the cosine rule: $L1^2=HM^2+LG^2-2*AM*LG*COSW6$. This means that:

$L1=ROOT(POWER(HM;2)+POWER((LG);2)-2*HM*(LG)*COS(W6)$ (2)

HM is obtained from the defined surface scratch height AH, using Pythagoras' theorem, to be:

$HM=ROOT(POWER(AH;2)+POWER((BS/2+TS);2))$ (3)

The angle W6 is also required for equation (2). This is given by:

$W6=90°+WHM+W5/2.$ (4)

The angle WHM is the angle between the connecting line HM and the surface scratch height AH in the center plane of the measurement bracket 12. If this angle WHM is applied to the path HM at the level of the optical axis 10, this results in a parallel to the center plane 20 or the measurement bracket 12 at the level of the mirror surface. An angle bisector of the angle W5 is at right angles to this plane of the mirror surface, since the angle W5 results from the reflection of a beam path in the optical axis 10 on the surface of the mirror 16. Half the angle W5 must therefore also be added to WHM+90° in order to obtain the size of the angle W6.

WHM is calculated in the right-angled triangle on the basis of TAN(WHM)BS/2+TS/AH so that:

$WHM=ARCTAN((BS/2\phi TS/AH)$ (5)

W5 is obtained from the measured height of the scale 1 (scale 1) to be;

$W5=ARCTAN(NPFS-\text{scale }1-0.5+\text{telescope diameter})/(LG)$ (6)

All the terms for equation (2) are thus defined.

The angle W4A is given by:

$W4A=90°-W4$ (7)

W4 is obtained from:

$W4=ARCSIN(HM/L1 *SIN(W6))$ (8)

Since W6 has already been determined (see equation (4)), W4 is now also known.

W8 together with W9 and W4A form the angles of a triangle, that is to say the sum of these angles is 180°. Thus:

$W8=180°-W4A-W9$ (9)

Since L1 and W4A are known from (2) and (7), and the length HG and, from this, the length of that side of the triangle lying in the steering axis 2 to HG−0.5 telescope diameter is known, this means that:

$W9=ARCTAN((HG-0.5\text{ telescope diameter}-L1)/(HG-0.5\text{ telescope diameter}+L1)*1/TAN(W4A/2)+90-W4A/2$ (10)

The angle W8 is thus also defined quantitatively, so that the frame length RL is obtained by substitution of the values determined from (2), (7) and (9).

Determination of the Frame Angle (RW)

It can be seen from FIG. 1 that:

$RW=180°-W8$ (11)

W8 is known from (9), so that RW is also known.

Determination of the Camber Error

The camber error is obtained from the measurement values HFLI and HFRE related to the distance between the measurement points on the crossbar 14 of the measurement bracket 12. The bracket edge is expediently used as a measurement mark for both measurements, so that the "scale distance" corresponds to the design bracket width, which is known.

Thus:

$$\text{Camber error} = \text{ARCTAN}\,((HFLI-HFRE)/\text{scale distance}) \quad (12)$$

Determination of the Steering Head Offset

The steering head offset represents the lateral distance of the headstock 1, in a plane parallel to the longitudinal plane of the vehicle, and the center of the swing-arm holder.

The eccentric mounting of the measurement bracket 12 thus given (AbstLi and AbstRe) as constant values. The steering head offset LKV is given by:

$$LKV = MA + KORR - AbstL1/2 + AbstRe/2 \quad (13)$$

The correction value KORR is given by $$KORR = (HG - \text{distance} - \text{surface scratch } MA - \text{telescope diameter}/2 - HF/2 \ast \text{SIN(camber error)}) \quad (14)$$

where;

$$HF = NPFS - \text{scale1} - 0.5 \ast \text{telescope diameter} \quad (15)$$

The steering head offset LKV which is to be determined is obtained by substituting (14) and (15) in (13).

The measurement accuracies are approximately 0.5 mm for the frame length, approximately 0.05° for the frame angle, and approximately 0.02° for the camber error.

As in the case of the other measurement methods, the results obtained can be converted to the coordinate systems provided by the manufacturers, and can thus be assessed directly.

Figure 4:
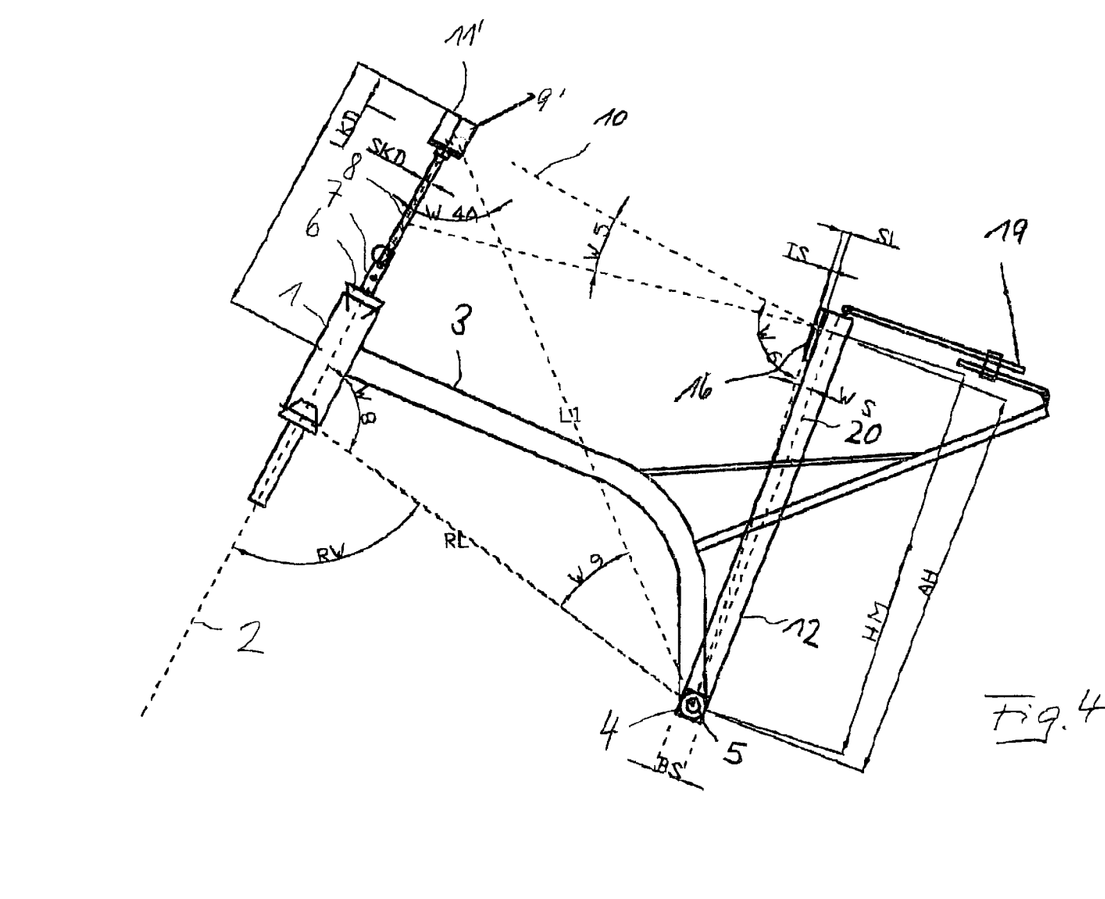

In the exemplary embodiment illustrated in FIG. 4, the telescope 9 is replaced by a laser head 9'. The housing of the laser head 9' is provided with an upper edge 11', which is arranged at a defined distance from the optical axis 10.

The evaluation of the measurements with the laser beam is carried out in an analogous manner to the description relating to FIGS. 1 to 3.

FIG. 4 also includes the variant of the mirror 16 not being aligned parallel to the center plane 20 of the bracket 12, but at an angle WS, so that the mirror plane runs through the center of the retaining hole 5. There in thus no need for the correction for determining the angle W6, as is required with the arrangement shown in FIG. 1.

Figure 5:
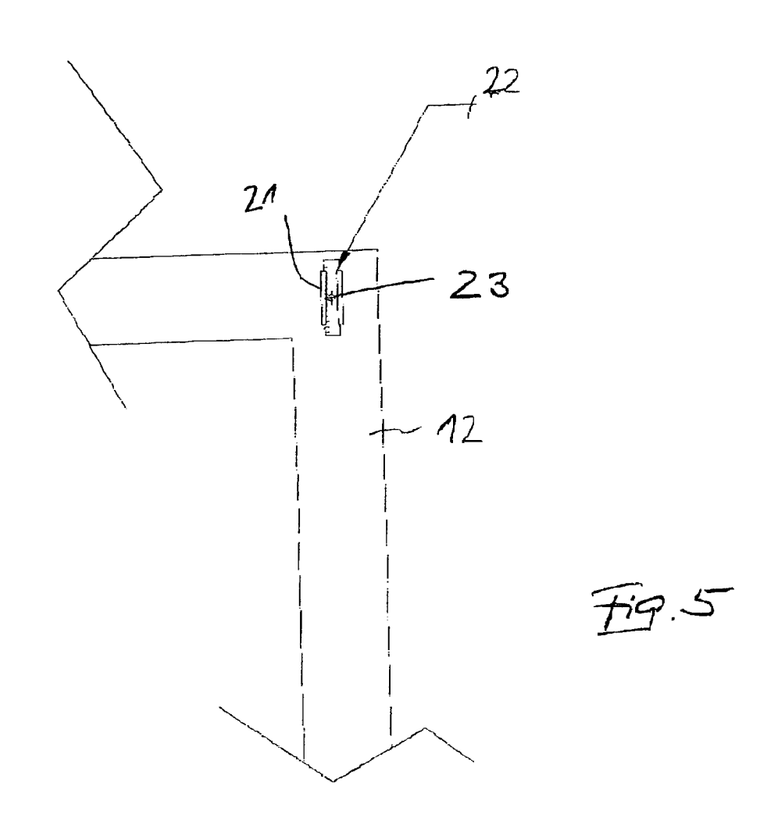

In FIG. 5, the frame 12 is designed with a scale 22, which can be adjusted via a vernier 21, at both corners, with the scale in each case being provided with a target reticle 23. This allows the required adjustments and measurements to be carried out and to be read very accurately. This arrangement is particularly suitable when the beam path is produced using a laser head 9'.

What we claim is:

1. Method for measurement of a two-wheeled vehicle frame, in which an essentially U-shaped measurement bracket (12) with two limbs (13) and an upper crossbar (14) is inserted, centered, into a retaining hole (5) which is at right angles to the longitudinal axis, and is moved to a fixed angular position, an optically acting component (9) is mounted in a defined position relative to the steering axis (2) of the two-wheeled vehicle frame, and a relative position between the measurement bracket (12) and the optical component (9) is fixed by means of a beam path between the measurement bracket (12) and the optically acting component (9), characterized in that the optically acting component (9) is mounted in the headstock (1) without any play but such that it can rotate, using an adjustable-height insert (7) which is provided with a first scale, the crossbar (14) is provided with a horizontal marking (18) and with a central horizontal second scale (17), the crossbar is provided with an optically acting surface (16), whose distance from a plane (20), which runs parallel to this surface through the center of the retaining hole (5), is defined, the optical component (9) is provided with a marking which allows a mechanical distance measurement to a marking (18) on the measurement bracket (12) and whose distance from the optical axis (10) of the beam path is defined, the distance between the horizontal marking (18) on the crossbar (14) of the measurement bracket (12) and the center axis or the retaining hole (5) is defined, and in that the parameters which are required for the measurement are determined using the defined constant dimensions, by means of mechanical measurements and optical determinations.

2. Method according to claim 1, characterized in that the optically acting component (9) is mounted in or an a headstock (1) of the two-wheeled vehicle frame.

3. Method according to claim 1, characterized in that the measurements are length measurements.

4. Method according to claim 1, characterized in that the beam path is defined by a telescope, which is used as an optical component and can be focused at different distances.

5. Method according to claim 4, characterized in that the telescope (9) is equipped with a reticle.

6. Method according to claim 1, characterized in that the beam path originates from a laser source.

7. Method according to claim 6, characterized in that a bar laser or cruciform laser is used as the laser source.

8. Method according to claim 1, characterized in that the second scale has a movable vernier, and in that the movable vernier is provided with a cruciform marking.

9. Method according to claim 1, characterized in that, in order to determine the frame length (RL) and the frame angle (RW), the beam path which originates from the optical component is aimed at the optically acting surface, and the point at which the beam which is reflected from the optically acting surface strikes the first scale is read, and is evaluated in conjunction with the mechanical length measurement between the marking on the optical component and the horizontal marking of the measurement bracket.

10. Method according to claim 1, characterized in that, in order to determine the camber error, the optical component is aimed at the horizontal marking on both sides of the measurement bracket by adjusting the height of the optical component, and in that the respective height setting is read on the first scale, and the difference is related to the distance between the measurement points.

11. Method according to claim 1, characterized in that, in order to determine the steering head offset (LKV), a mean error (MA) in the zero point of the second scale is determined by aiming the optical component at the center of the first scale after which the height of the optical component is moved to the second scale, and the point at which it strikes the second scale is read, and in that the value that is read is corrected by a measurement of the eccentric mounting of the measurement bracket and taking account of any camber error that is found.

12. Measurement device for measurement of a two-wheeled vehicle frame having an essentially U-shaped measurement bracket (12), which can be centered in a retaining hole (5) that is at right angles to the longitudinal axis, can be fixed in a fixed angular position, and has two limbs (13) and an upper crossbar (14), and having an optically acting component (9), which is mounted in a defined position relative to the steering axis (2) of the two-wheeled vehicle frame, in order to form a beam path between the measurement bracket (12) and the optically acting component (9), characterized in that the optically acting component (9) is mounted without any play but such that it can rotate, using an adjustable-height insert (7) which is provided with a first scale, the crossbar (14) is provided with a horizontal marking (18) and with a central horizontal second scale (17), the crossbar is provided with an optically acting surface (16), whose distance from a plane (20), which runs parallel to this surface through the center of the retaining hole (5) is defined, the optical component (9) is provided with a marking which allows a mechanical distance measurement to a marking (18) on the measurement bracket (12) and whose distance from the optical axis (10) of the beam path is defined, the distance between the horizontal marking (18) on the crossbar (14) of the measurement bracket (12) and the center axis of the retaining hole (5) is defined.

13. Measurement device according to claim 12, characterized in that the optically acting component (9) is mounted in or on a headstock (1) of the two-wheeled vehicle frame.

14. Measurement device according to claim 12, having a telescope as the optically acting component.

15. Measurement device according to claim 14, characterized in that the telescope is equipped with a reticle.

16. Measurement device according to claim 12, having a laser source as the optically acting component.

17. Measurement device according to claim 16, characterized in that the laser source in a bar laser or cruciform laser.

18. Measurement device according to claim 12, characterized in that the second scale has a movable vernier and in that the movable vernier is provided with a cruciform marking.

19. Measurement device according to claim 12, characterized in that a further marking is provided on the optical component, which is located at a defined distance from the zero point of the first scale (NPFS) and whose distance from the optical axis in the direction of the first scale is defined.

* * * * *